Figure 1:
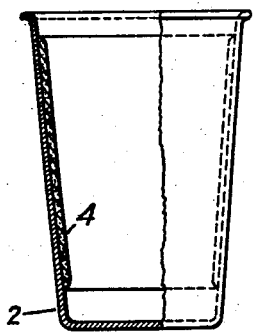

Dec. 1, 1936.  C. O. R. MICHEL ET AL  2,062,897
CONTAINER FOR A LIQUID
Filed Jan. 29, 1931

INVENTORS
Charles O. R. Michel and
Albert C. Hunkeler
BY
F. H. Miller
ATTORNEY

Patented Dec. 1, 1936

2,062,897

UNITED STATES PATENT OFFICE 2,062,897

CONTAINER FOR A LIQUID

Charles O. R. Michel, New York, N. Y., and Albert C. Hunkeler, Wilkinsburg, Pa.

Application January 29, 1931, Serial No. 512,044

7 Claims. (Cl. 206—47)

Our invention relates to containers for liquids and particularly to drinking cups having soluble substances for beverage and medicinal purposes constituted as parts thereof.

One object of our invention is to provide a cup, or equivalent container for a liquid, that shall be simple and durable in construction, economical to manufacture and effective in its operation.

Another object of our invention is to provide a cup that shall contain a soluble substance as a part thereof, and be capable of use as an ordinary cup irrespective of the presence of said substance, and that shall permit the conversion of the cup, by a simple manipulation, to a condition whereby the placing of liquid in a portion of the cup dissolves said substance.

Another object of our invention is to provide a combined cup and soluble-substance unit in which the soluble substance shall be self agitating, when a liquid is placed in the cup.

Another object of our invention is to prevent the sticking together of duplicate nesting cups, whether ordinarily caused by adherence between the bodies of the cups or by the presence of a soluble substance constituting part thereof.

Another object of our invention is to provide a combined cup and soluble-substance unit wherein the substance shall comprise a relatively thin lining for the cup, to accelerate the dissolution of the substance, to render the unit more symmetrical and better balanced, and to facilitate the nesting thereof with similar units.

Another object of our invention is to provide a combined cup and soluble substance unit that shall be adapted to support the substance either as a homogeneous mass or as a separable granular mass.

A further object of our invention is to provide a device, of the above-indicated character, that shall be more sanitary and retain the life of the substance for a longer period of time than similar devices of which we are aware.

With such objects in view, as well as other advantages which may be incident to the utilization of the improvement, the invention comprises the parts and combinations thereof hereinafter set forth and claimed, with the understanding that the several necessary elements constituting the same may be varied in proportion, arrangement and texture without departing from the nature and scope of the invention.

Heretofore, drinking cup units, having beverage material as parts thereof, have been suggested for facilitating the quick production of beverages, such as cups having exposed relatively hard tablets at the bottoms of the cups or relatively massive soluble bodies that are insufficiently protected.

In cups of the first-mentioned character, the material is subject to relatively rapid deterioration from age, and exposure, separation from the cups, delayed dissolution and other objections.

In cups of the second-mentioned type, in which relatively massive bodies of soluble material are disposed and covered at the bottoms of the cups, dust, which collects above the covers, falls against the beverage material, when the covers are removed, and the massive bodies consume considerable time in dissolving.

Cups of edible material, including flavoring tablets for dissolution when the cups are filled with liquid, are fragile, subject to rapid staleness and other objections.

We are also aware of a suggestion along these lines, in which a cup body and a lining therefor are both of edible material but in which the lining is of liquid-impervious material; such a cup being impermanent, fragile, subject to rapid deterioration and of entirely different character from the cup of our invention, as will hereinafter appear.

It is our aim to overcome all of the objections to prior cups of this character, of which we are aware, and, accordingly, in practicing our invention, we provide a cup unit having a soluble substance as an operatively integral part thereof that is in quickly soluble form, perfectly protected, positioned for self agitation and prevented from adhering to adjacent nesting cups, and an inner cup for sealing the substance and permitting the cup unit to be used as an ordinary cup before dissolution of the substance; it being within the perview of the invention to employ all of these features together or in the various combinations that they will permit, as desired.

In order to make the invention more clearly understood, means are shown in the accompanying drawing for carrying the same into practical effect without limiting the improvements in their useful applications, to the particular constructions which, for the purpose of explanation, are made the subject of illustration.

Figure 2:
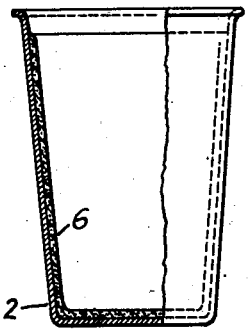
Figure 3:
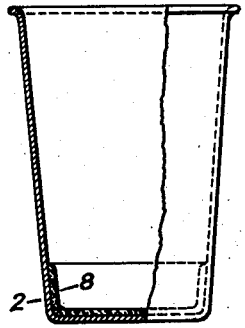
Figure 4:
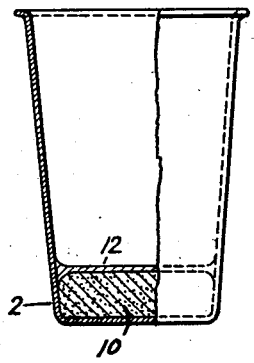
Figure 5:
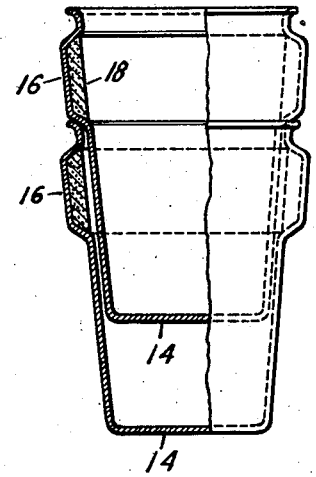
Figure 6:
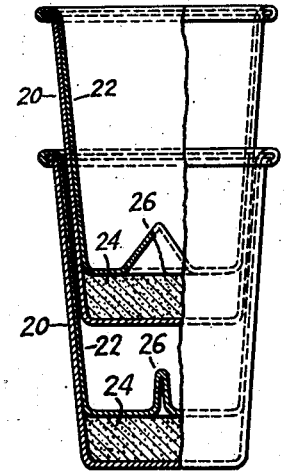

Figure 1 of the accompanying drawing, is a view, partially in side elevation and partially in section, of a cup unit embodying our invention, Figs. 2, 3 and 4 are similar views of modified forms thereof, Fig. 5 is a view, similar to the previous figures, of a plurality of nested cups constituting further modifications of our invention, and Fig. 6 is a view, similar to Fig. 5, of a still further modification of our invention and illustrating a feature that may, and preferably shall be, added to the structure of the other figures; it being omitted from the other figures for simplicity of illustration and to indicate the independence of the other structures from it, in certain aspects of the invention.

As shown in Fig. 1, the device comprises a cup 2, preferably of material, such as paraffined paper or molded composition, that is normally impervious to liquid and shaped to permit nesting with duplicate or like cups. These materials and this shape are preferred for the purpose of vending the device from slot machines, although other materials and shapes may be employed in other aspects of the invention.

One of these aspects resides in the feature wherein a body 4 of soluble material, for beverage, medicinal or chemical purposes, is provided as an operatively-integral, relatively thin lining for the inner longitudinal side surface of the cup 2. This feature of a thin lining, irrespective of its particular position in the cup, conduces to the rapid dissolution of the substance because of the extreme exposed area and the reduced thickness of the mass. Having it on the longitudinal sides causes it to drop therefrom, if heavier than the solvent employed, to be in effect self-agitating or more or less free from the requirement of an implement for agitating it, and, in any event, to be more widely distributed relative to the solvent.

Merely as shown, the device is complete and useful in many ways and may be protected by wrapping, storing in larger containers or by other suitable means. However, for certain other purposes of our invention, it is preferred that the unit comprise a still further element, as will appear in connection with Fig. 6. Also, the material 2 may be in the form of a self-sustaining body, as illustrated in Fig. 1, or be of loose granular construction, held by a soluble film, as will be described in connection with Fig. 4.

In Fig. 2, the cup 2 is preferably the same as in Fig. 1 and the soluble material in the form of a cup 6 that occupies not only the longitudinal surfaces but also, the bottom of the cup 2; this construction providing more of the thin lining, depending on the nature of the material. Also, for certain purposes, the cup 6 may be self-sustaining and either secured to, or loosely associated with the cup 2, or be of granular construction and held by a film to be described, as aforesaid, in connection with Fig. 4.

In Fig. 3, the soluble material may be in the form of a shallow cup 8, depending on the strength of the solution required in consideration of the volume of the cup 2, or other considerations, such as the depth of nesting of the unit with other units, the kind and character of the material and other factors.

Also, the relatively thin lining 4, 6 and 8 of Figs. 1, 2 and 3, respectively, may be in various other forms, such as strips, disks, bands, cups with side slots, bottom openings, etc. The forms shown are merely illustrative of the many adaptations of the invention.

In Fig. 4, a soluble substance 10 is sealed and positioned by a gelatinous or like soluble film 12 whereby, in another aspect of the invention, the material 10 may be granular, self-sustaining or of other character, and of thick or filmy body.

As shown, the body 10 is in granular or powder form and the film 12 in adherence to the sides of the cup 2, although here also, the film 12 may surround the body 10 or be otherwise arranged. The film 12 may be active, in a flavor or chemical sense, or inert or neutral.

In Fig. 5, duplicate cups 14 are provided with annular portions 16, intermediate the ends thereof, that form external ridges and internal channels or pockets. The soluble material is in the form of bands 18 in the portions 16 and has the outer surfaces thereof spaced from the sides of the adjacent nested cup. In this form, the portions 16 are adapted for seating on the open-end perimeters or mouth-ends of the next lower cups, so that the cups are prevented from sticking to each other, either from their own adherence or from contact with the soluble material.

Also, in the structure of Fig. 5, the soluble material is sufficiently above the bottom of each cup that, when the latter is substantially filled with a liquid, a heavier soluble material will tend to be agitated, without the aid of a spoon or other agitator, and more evenly distributed, than where the material is at the bottom of the cup.

In Fig. 6, are illustrated a plurality of nested double-cup units, in each of which an outer cup 20 may be similar to the cups 2 or 14, or otherwise suitably constructed, for the reception of an inner cup 22 that is suitably sealed thereto with a soluble body 24 therebetween; a handle portion 26 being provided at the bottom of the inner cup, if the latter is removably secured in position, for the removal thereof.

The handle 26 may be provided by having the inner cup initially of substantially conical shape and pushing in the pointed or smaller end to substantially the shape shown. If it is desired to more permanently secure the inner cup in position, the handle 26 may be torn from position or the inner cup otherwise adapted for tearing off a portion thereof to give the solvent access to the soluble material. Openings of various sizes, shapes and positions may be provided in the inner cup, in a manner similar to that of tearing off the handle 26, and a handle of other shapes and positions provided, such as a small extension or lip near the top of the cup.

It may be seen that the inner cup element of Fig. 6 may be added to the structure of each of the other figures; this feature being generic to them in certain aspects and independent of them in other aspects.

For instance, when the soluble material is of antiseptic nature and will not be exposed to unfavorable conditions, the inner cup may not be necessary. Also, in certain medicinal or chemical operations, where the cup is not for drinking purposes, it may not be necessary to provide the inner cup.

However, and in general, where the cup unit is for general distribution as a drinking vessel, either in a slot machine or otherwise, the inner cup is desirable both for protection to the soluble substance and to enable the user to take a drink of any other kind before dissolving the substance.

In the latter aspect, the invention is better than any other similar device of which we are aware, in that the cups may be handled in loose lots at roadside dispensaries and other places, where slot machines may only have seasonal or other intermittent use.

Some of the soluble or suspension substances contemplated for use, are fruit extracts, such as lemon, orange and the like, milk concentrate, powdered coffee, malted milk, chocolate, boric acid, iodine, sodium phosphate, sodium bicarbonate and any of many others for internal and external human application and relief, as well as for purely chemical or other purposes.

We claim as our invention:

1. A composite drinking-vessel device comprising a pair of liquid-impervious component cups separably held together in nested relation having mouth-end edges in adjacent relation to each other, the device being operative as a single cup capable of use for drinking from it and including a soluble substance sealed in position by, and between, the cups, the inner cup being free from inner obstruction appreciably interfering with its effective sanitary use for drinking either as a part of, or separate from, the composite vessel, and the outer cup being effective for separate use for drinking after the removal of the inner cup therefrom.

2. A composite drinking-vessel device comprising a liquid-impervious cup as one component, and a soluble substance as another component in the cup, said substance being provided in such quantity that, when the cup is substantially filled with water, a beverage will be produced of preselected concentration for drinking, the substance further being held in adherence to inner side walls of the cup above the cup bottom such that, when the water is introduced into the cup, the substance will be broken up by the water and precipitated toward the cup bottom to thereby cause a stirring or mixing action accelerating the production of the beverage without the aid of a spoon or like stirring implement.

3. A composite drinking-vessel device comprising a liquid-impervious outer cup capable of use for drinking and adapted to receive an inner cup thereto wtih the mouth-end edge of the inner and outer cups disposed in adjacent relation and the device including the inner and outer cups operative as a single cup capable of use for drinking, and a soluble substance in the outer cup for sealing by, and between, the cups which, when the inner cup is withdrawn, and the outer cup is substantially filled with water, will produce a beverage of preselected concentration, said substance being spread out over, and in adherence to, an inner surface of the outer cup in a layer of such thinness as to accelerate its dissolution to substantially a maximum.

4. A composite drinking vessel comprising a pair of liquid-impervious component cups separably held together in nested relation by having the mouth-edge margins thereof crimped together and operative as a single-cup unit capable of use for drinking and including a soluble substance sealed in position by, and between, the component cups, the inner cup being free from inner obstruction of a character appreciably interfering with its effective sanitary use as an ordinary cup for drinking, and the outer cup also being for separate use for drinking.

5. A composite drinking vessel comprising liquid-impervious inner and outer component cups each capable of use for drinking and operatively held together in separable nested sealed relation as a composite unit also capable of use for drinking and including a substance between said component cups for coaction with a liquid in the outer component cup after separation of the component cups, and means on an impervious portion of the inner cup constituting a grip for assisting in separating the cups, said means and the interior of the inner cup being of a character rendering the inner cup capable of effective use as an ordinary cup.

6. A drinking vessel comprising a pair of liquid-impervious paper cups capable of separate use for drinking and of only slightly different length and shape admitting one to the other in a snug nested fit providing a slight space between the bottoms, the mouth end edge of the inner cup being crimped about an out-turned flange at the mouth end of the outer cup, and the former having a liquid-impervious integral upward bottom extension constituting a handle for removal of the inner cup when the mouth-end edges of the cups are detached.

7. A drinking vessel comprising a pair of liquid-impervious paper cups capable of separate use for drinking and of only slightly different length and shape admitting one to the other in a snug nested fit providing a slight space between the bottoms, the mouth end edge of the inner cup being crimped about an out-turned flange of the mouth of the outer cup, the inner cup having a liquid-impervious integral upward extension at the bottom constituting a handle for removal of the inner cup when the mouth-end edges of the cups are detached, and a body of soluble substance sealed by the cups in said space.

CHARLES MICHEL.
ALBERT C. HUNKELER.